United States Patent
Petrucci et al.

(10) Patent No.: US 9,794,983 B2
(45) Date of Patent: Oct. 17, 2017

(54) EMBEDDED ANTENNA SYSTEM FOR A VEHICLE

(71) Applicant: GM Global Technology Operations LLC, Detroit, MI (US)

(72) Inventors: David R. Petrucci, Warren, MI (US);
Charles A. Massoll, Milford, MI (US);
David Heiden, Clarkston, MI (US);
Duane S. Carper, Davison, MI (US);
Timothy J. Talty, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 492 days.

(21) Appl. No.: 14/470,420

(22) Filed: Aug. 27, 2014

(65) Prior Publication Data

US 2016/0064805 A1   Mar. 3, 2016

(51) Int. Cl.
*H01Q 1/32* (2006.01)
*H04W 88/08* (2009.01)
*H01Q 1/36* (2006.01)
*H01Q 1/38* (2006.01)
*H01Q 21/28* (2006.01)

(52) U.S. Cl.
CPC .......... *H04W 88/08* (2013.01); *H01Q 1/3291* (2013.01); *H01Q 1/36* (2013.01); *H01Q 1/38* (2013.01); *H01Q 21/28* (2013.01)

(58) Field of Classification Search
CPC ....... H04W 88/08; H01Q 1/3291; H01Q 1/38; H01Q 1/36; H01Q 1/32; H01Q 21/28; H01Q 21/30; H04L 67/12
See application file for complete search history.

(56) References Cited

U.S. PATENT DOCUMENTS

| | | | |
|---|---|---|---|
| 9,072,771 B1 * | 7/2015 | Goetz | H01Q 1/28 |
| 2004/0108963 A1 * | 6/2004 | Clymer | H01Q 1/32 |
| | | | 343/837 |
| 2011/0012798 A1 * | 1/2011 | Triolo | H01Q 21/28 |
| | | | 343/713 |
| 2016/0204519 A1 * | 7/2016 | Lafleur | H01Q 1/38 |
| | | | 342/357.39 |

\* cited by examiner

*Primary Examiner* — Thanh Le
(74) *Attorney, Agent, or Firm* — Christopher DeVries; Reising Ethington P.C.

(57) ABSTRACT

An antenna assembly for a vehicle and a method of using the antenna assembly with a vehicle communication system. The assembly includes a substrate and an antenna array. The substrate may be sized for a radio frequency-friendly (RF-friendly) region in the vehicle, and the antenna array carried by the substrate. The antenna array includes two or more antennas configured for communication in different RF bands.

13 Claims, 5 Drawing Sheets

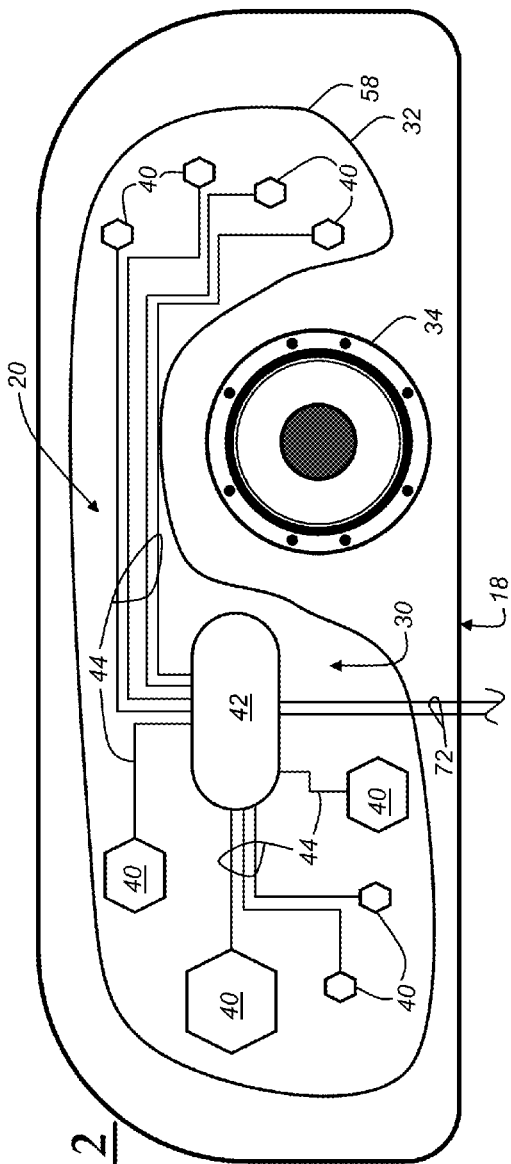
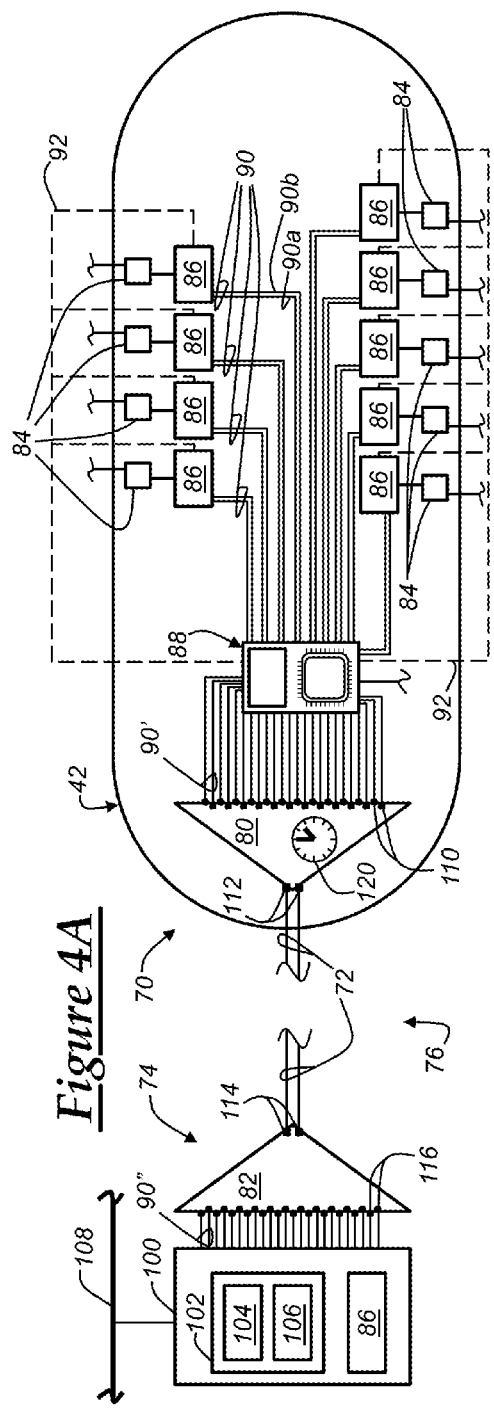
*Figure 2*
*Figure 4A*

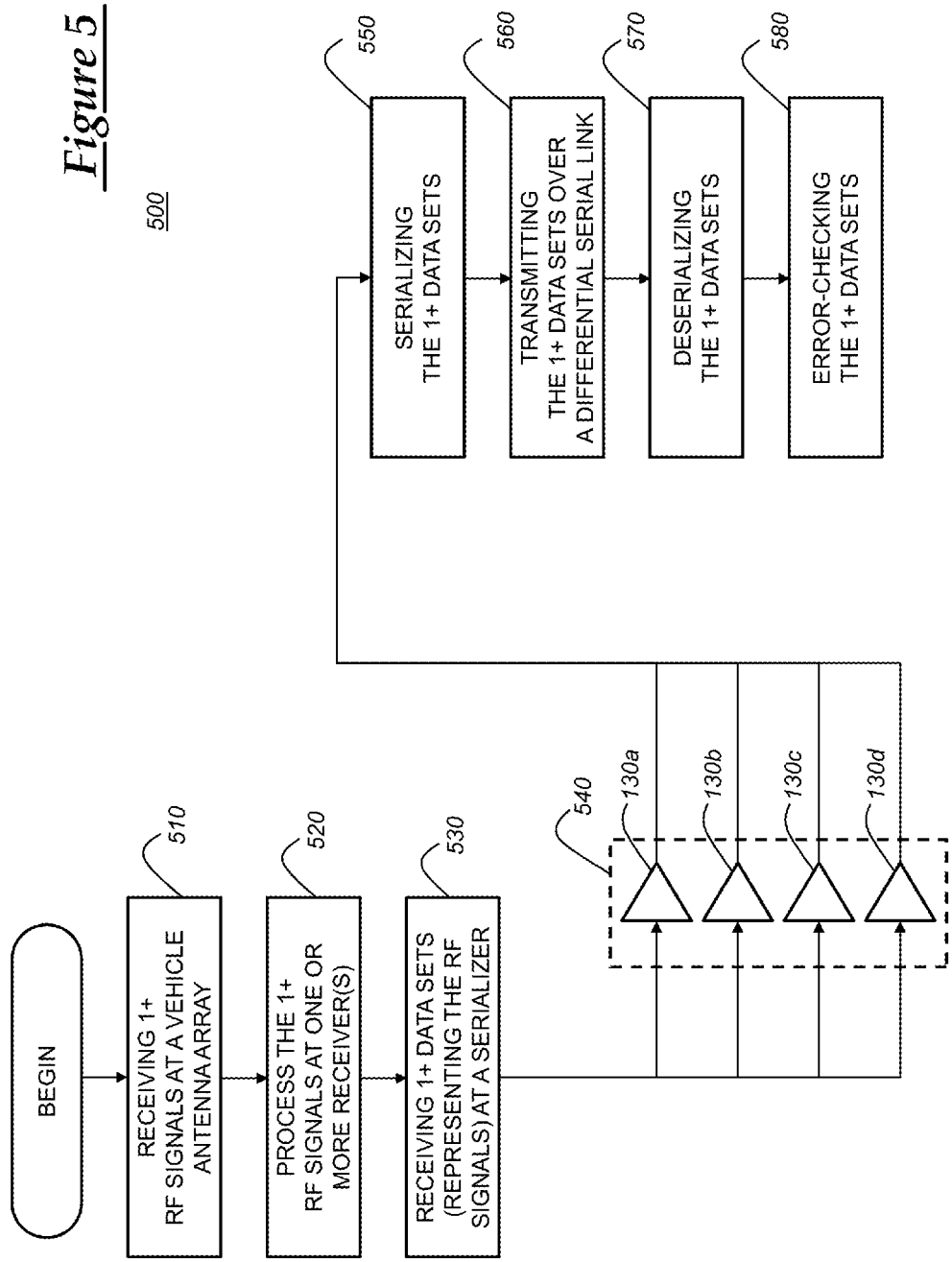

EMBEDDED ANTENNA SYSTEM FOR A VEHICLE

TECHNICAL FIELD

The present invention relates to an embedded antenna system in a vehicle.

BACKGROUND

Antennas are electrical devices configured to receive and transmit electric power in the form of an electro-magnetic (EM) wave. Antennas designs include straight wire configurations, loop configurations, and even thin or low profile configurations (e.g., flat coil profiles).

SUMMARY

According to an embodiment of the invention, there is provided an antenna assembly for a vehicle. The assembly includes a substrate and an antenna array. The substrate may be sized for a radio frequency-friendly (RF-friendly) region in the vehicle, and the antenna array carried by the substrate. The antenna array includes two or more antennas configured for communication in different RF bands.

BRIEF DESCRIPTION OF THE DRAWINGS

One or more embodiments of the invention will hereinafter be described in conjunction with the appended drawings, wherein like designations denote like elements, and wherein:

FIG. 2 is a schematic view depicting a portion of a communication system for a vehicle that is capable of utilizing the method(s) disclosed herein;

FIG. 4A is a detailed schematic view of a portion of the vehicle communication system of FIG. 2;

FIG. 5 is a flow diagram illustrating a method of using the vehicle communication system described herein;

DETAILED DESCRIPTION OF THE ILLUSTRATED EMBODIMENT(S)

The system and methods described below pertain to a vehicle communication system having an antenna assembly having an array of embedded antennas carried by a substrate and located proximate to one another in the vehicle. Modern vehicles may comprise a variety of antennas configured for reception over one or more bandwidths. For example, a vehicle may have an AM antenna, an FM antenna, a GPS antenna, and a cellular antenna, just to name a few examples.

Figure 1:
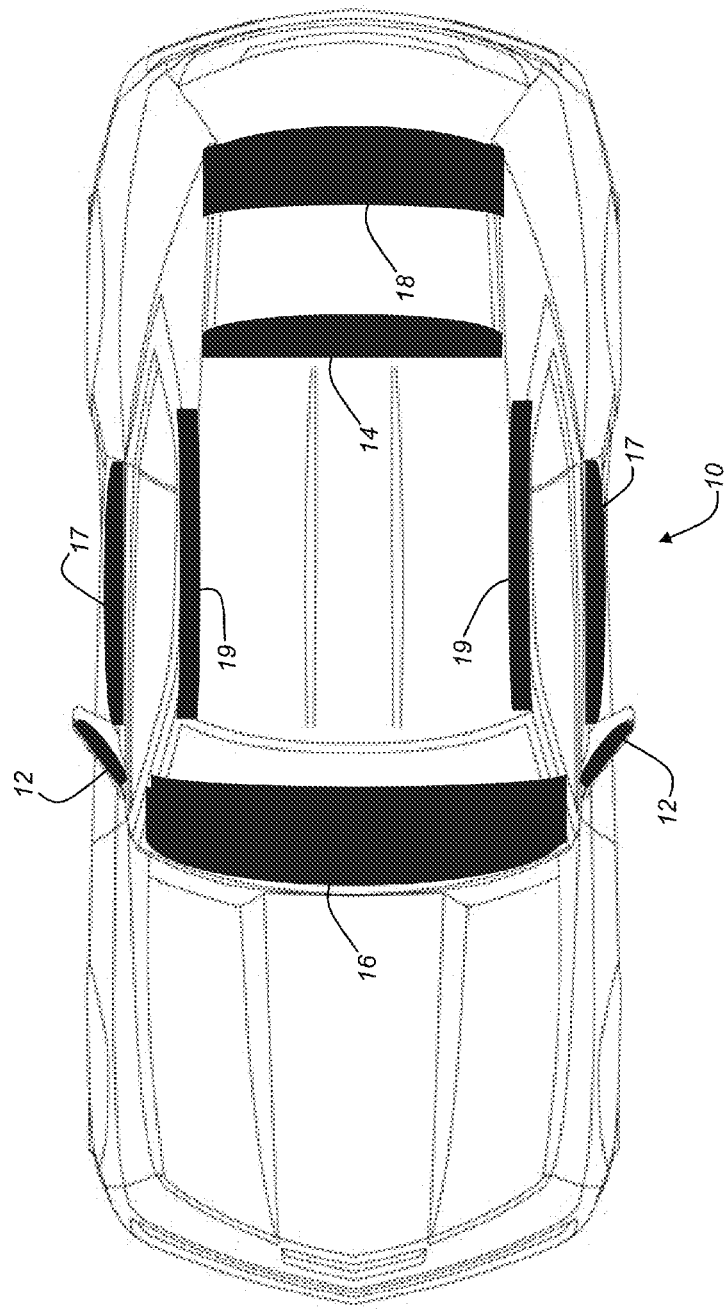
FIG. 1 is a schematic view depicting regions of a vehicle suitable for carrying an antenna array.

The vehicle communication system of the present disclosure further includes a data transfer system coupled to the antenna array for facilitating the delivery of wireless data received by the antenna array to components located elsewhere in the vehicle. The antenna assembly may or may not include an associated receiver adapted to receive wireless signal(s); i.e., in at least some embodiments, the receiver may be one of the remotely located components (e.g., not carried by the substrate, but located elsewhere in the vehicle). In other embodiments, the receiver is carried by the substrate with its respective antenna. Regardless, according to at least one embodiment presented herein is an antenna array coupled to a data transfer system which ultimately reduces hardware cost, weight, and packaging constraints while maintaining desirable high-speed communication links between the array of antennas and their associated components. Also, according some embodiments, this embedded antenna array may be concealed or hidden from view in an RF-friendly region of the vehicle—e.g., hidden from the view of vehicle occupants or those situated outside of the vehicle during normal vehicle use. For example as shown in FIG. 1, a vehicle 10 may have embedded arrays located in a mirror assembly 12, a headliner 14, an instrument panel 16, a door panel 17, any suitable region of the interior trim 19 (e.g., bordering the headliner or a composite panel, just to name a few examples), or a shelf or rear package shelf 18, just to provide a few examples.

Communications System—

FIG. 2 illustrates an example of the shelf 18 carrying at least a portion of a vehicle communication system 20 that includes an antenna assembly 58 having an antenna array 30 carried by a substrate 32. FIG. 2 also illustrates a conventional vehicle component 34 (here illustrated as an audio system speaker). The substrate 32 may be configured so as to not interfere with conventional vehicle components (such as speaker 34) which may be located in desired or common locations with the vehicle 10 (e.g., where the speaker is positioned in the shelf 18 for optimal sound quality, the substrate configuration may be configured so as to not interfere with or impede that quality). In FIG. 2, the illustrative substrate 32 is generally planar and saddle-shaped fitting within the periphery of the shelf 18 while accommodating the placement of the speaker.

Figure 4C:
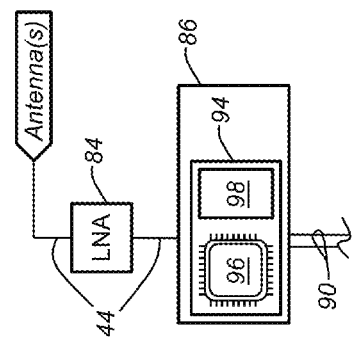
FIG. 4C is a schematic view of another component shown in FIG. 4A.

The antenna array 30 may include multiple antennas 40 for receiving wireless signal data; in FIG. 2, nine antennas 40 are shown, however, this is merely an example (more or less may be carried by the substrate 32). The antennas 40 may be configured to receive electromagnetic (EM) radiation according to one or more frequencies; in one embodiment, the antennas are configured to receive 'radio waves,' as that term is understood by skilled artisans. FIG. 2 illustrates that each antenna 40 is coupled via an electrical coupling 44 to a coupling region 42, an embodiment of which is shown in greater detail in FIGS. 4A, 4B, and 4C. The couplings 44 may be wires, traces, or any other suitable communication means carried by the substrate 32.

Figure 3A:
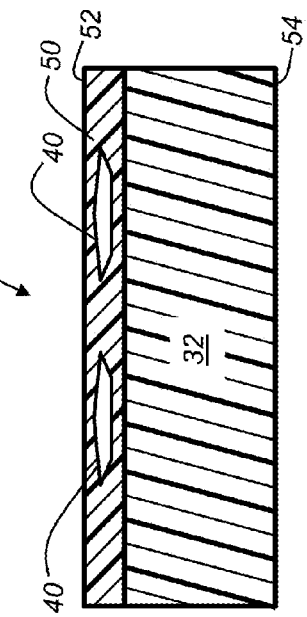
FIG. 3A is a schematic sectional view of an antenna assembly.

A schematic sectional view of the antenna assembly 58 is shown in FIG. 3A (see also an elevation view of an embodiment in FIG. 3D); the assembly 58 includes the substrate 32 and at least a portion of the antenna array 30. One or more of the antennas 40 may be fully embedded, partially embedded, or surface mounted within the substrate 32. The substrate 32 may comprise a dielectric material having one or more conductive properties. For example, one conductive property may include RF transparency; i.e., the dielectric material may be comprised of material to selectively filter certain frequencies, or conversely to allow one or more frequencies to pass therethrough. Suitable examples of the dielectric material include carbon fiber laced with gold (Au). The conductive properties may be similar to those of gold (Au), silver (Ag), tin (Sn), copper (Cu), and any other material having suitable EM properties (e.g., commercially available conductive paint).

Figure 3B:
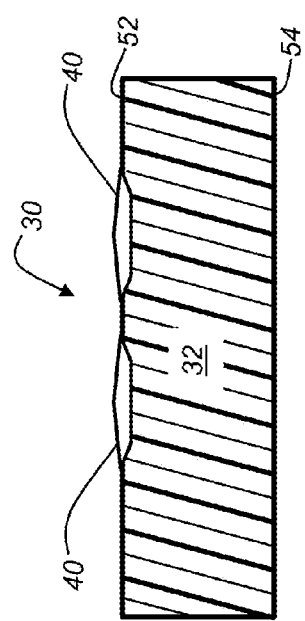
FIG. 3B is a schematic sectional view of another antenna assembly.

According to another embodiment (and as shown in FIG. 3B), the substrate 32 further may comprise a film or tape 50 (e.g., a polyester material such as Mylar™) for carrying the antennas 40. For example, the film 50 may be geometrically sized to carry the entire antenna—e.g., in length, width, and height (or thickness). The antennas 40 may be entirely enveloped by the film 50 (as shown) or may be partially or fully exposed to the atmosphere. Thus, the antenna profiles may be thin or very thin or very very thin, as those phrases are generally understood by skilled artisans. The antennas 40 may be configured to receive a single (or narrow band) of frequencies (e.g., a portion of one of the RF bands described below) or a wider band (e.g., a larger portion of or all of one of the bands described below) or even multiple bands (or portions thereof). Thus, while the film 50 is shown as an upper layer of the substrate, in some implementations, the film 50 may be a lower layer and operate effectively (e.g., where the substrate is configured to pass the desired frequencies to the lower layer carrying fractal antennas, as discussed below).

Figure 3D:
FIG. 3D illustrates an elevation view of a fractal antenna.
Figure 3C:
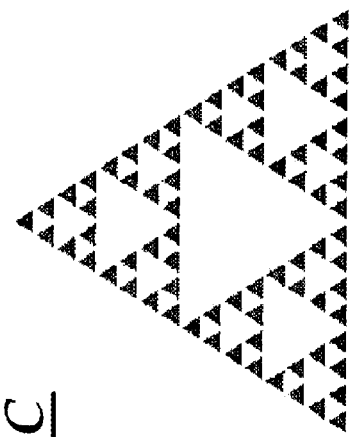
FIG. 3C illustrates a top view of a fractal antenna.

In one illustrative embodiment shown in FIG. 3C, the antennas 40 may be fractal or multilevel antennas or space-filling curve antennas. Non-limiting examples include a two-dimensional fractal pattern, a three-dimensional fractal pattern, a spiral pattern, a microstrip pattern, a printed pattern, a Yagi three-dimensional pattern, a di-pole pattern, a parabolic pattern, a loop pattern, or any combination thereof. The antennas 40 may be grown in or on the film 50 according to known techniques; furthermore, desired shapes and sizes will be appreciated by skill artisans. Thus according to at least one embodiment, the film 50 may be adhered to the substrate 32 (e.g., on the upper or lower face 52, 54). The embodiments shown in FIGS. 3C and 3D are merely examples; other examples of suitable fractal antennas also exist.

According to one illustrative embodiment, at least some of the antennas 40 are associated with different radio frequency (RF) bands. As used herein, the RF bands may be defined by the International Telecommunications Union (ITU). For example, each of the antennas may be configured to receive wireless signals from one of the following bands: very low frequency (VLF) [3-30 kHz], low frequency (LF) [30-300 kHz], medium frequency (MF) [300-3000 kHz], high frequency (HF) [3-30 MHz], very high frequency (VHF) [30-300 MHz], ultra high frequency (UHF) [300-3000 MHz], super high frequency (SHF) [3-30 GHz], extremely high frequency (EHF) [30-300 GHz], or tremendously high frequency (THF) [300-3000 GHz], just to name a few. Other ITU bands are also possible.

In at least one embodiment, the antenna assembly 58 is concealed or hidden from view during ordinary or typical use—e.g., hidden from view of the vehicle occupants and/or those outside of the vehicle. Moreover, the substrate may be situated in an RF-friendly region of the vehicle 10; e.g., in regions substantially devoid of electro-magnetic interference (EMI). For example, where the antenna substrate 32 is located at the shelf 18, it may be hidden by leather, vinyl, plastic (e.g., trim or molding), carpeting, or any other suitably aesthetic enclosure or covering; however, this is not required.

As shown in FIG. 4A, the substrate 32 may carry not only the antenna array 30 and couplings 44, but also additional electronics—collectively referred to herein as an uplink portion or transmitter portion 70. The uplink portion 70 may be connected via a differential serial link 72 to a downlink portion or receiver portion 74 located elsewhere in the vehicle (or at least not on the substrate 32). The uplink and downlink portions 70, 74 collectively define the communication system 20 that enables the wired transmission of wireless signal data in the vehicle 10 (e.g., as digital data).

In at least one embodiment, the uplink portion 70 further comprises a first, high-speed transmitter 80 for receiving wireless signal data from the antennas 40, and the downlink portion 74 includes a high-speed receiver 82 for receiving the wireless signal data via the serial link 72. Collectively, the s transmitter and receiver 80, 82 and the link 72 comprise a data transfer system 76 which may be used to transfer wireless signal data in the vehicle and reduce hardware cost, weight, and packaging constraints while maintaining desirable high-speed communication.

Figure 4D:
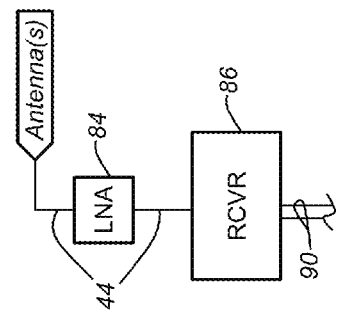
FIG. 4D is a schematic view of an alternative embodiment of the component shown in FIG. FC.
Figure 4B:
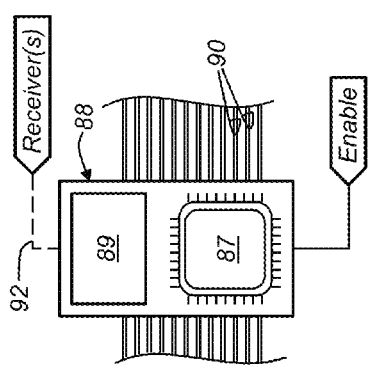
FIG. 4B is a schematic view of a component shown in FIG. 4A.

The uplink portion 70 also may include low-noise amplifiers (LNAs) 84, RF receivers 86, and a master processing unit 88 (having one or more processor(s) 87 and one or more memory units 89, see also FIG. 4B). The RF receivers 86 may include tuners, decoders, analog-to-digital (ADC) converters, application specific integrated circuits (ASICs), one or more processors, memory, and/or any suitable non-transitory computer readable medium with instructions suitably configured to utilize, reformat, configure, etc. the wireless data (e.g., now digitized) transmitted via the transmitter 80 and received via the receiver 82. Techniques for using RF receivers 86 configured to receive wireless signals from antennas 40 are known to artisans of ordinary skill. In one embodiment, for each respective antenna 40, the antenna 40 may be directly coupled to one LNA 84 which may be coupled to one RF receiver 86 which may then be coupled to the master processing unit 88 (see also FIG. 4C) via a data connection or coupling 90. In some implementations, the processing unit 88 may have communication links 92 to one or more of the RF receivers 86; however, this is not required. Ultimately, the master processing unit 88 provides by couplings 90' any received wireless data to the transmitter 80. Couplings 90' may or may not correspond to couplings 90.

Figure 6:
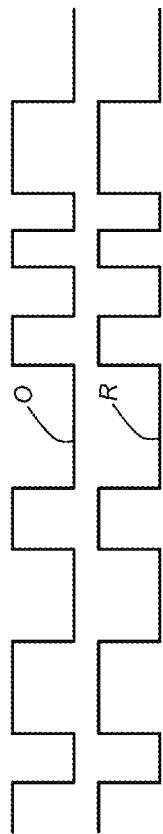
FIG. 6 illustrates data signals according to a signal mirroring technique.
Figure 7:
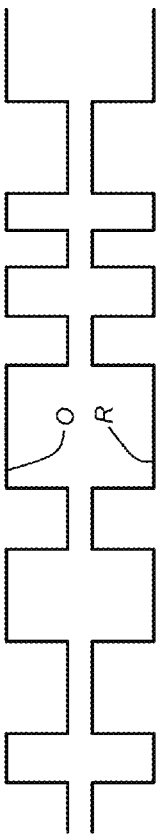
FIG. 7 illustrates data signals according to a signal inversion technique.

In at least one implementation, each data connection 90 comprises dual or parallel data connections 90a, 90b which, as will be explained in greater detail below, may be used to transmit a pair of data. For example, the pair may include primary or original data or data streams O (see FIGS. 6-7) and redundant or duplicative data or data streams R (see FIGS. 6-7). The original data may be representative of the actually received EM signal—e.g., it may be identical or a mirror of the original. The redundant data may be representative of an inversion of the received EM signal—e.g., digitally speaking, where the original data is a "1," the inverted redundant data is a "0." In any instance, the connection 90 may carry at least a pair of data (via 90a, 90b) for error-checking and validation, as also will be explained below.

In an alternative embodiment, the uplink portion 70 includes slave processing units 94 in addition to dedicated RF receivers 86 (see FIG. 4D). Each slave processing unit includes a processor 96 and memory 98. A dedicated RF receiver may be an application specific integrated circuit (ASIC) having a microprocessor. Other embodiments also exist, including an embodiment having and the slave processing unit 94 absent the RF receiver 86.

Turning now to the downlink portion 74, the receiver 82 is shown electrically coupled to one or more electronic devices that includes an electronic control unit (ECU) 100 having a processing unit 102 for processing (the now digitized) wireless signal data received via the receiver 82 (the unit 102 including one or more processors 104 and memory 106). The ECU 100 may be coupled to a bus 108 which may be used to convey the wireless signal data elsewhere in the vehicle 10 as well. Data buses such as bus 108 and techniques employed to utilize data buses are known to skilled artisans. In general, the system 20 may be used to receive wireless signal data from the antenna array 30 and transmit the data over the link 72 at high-speed to the remote receiver 82 and ECU 100.

In at least one embodiment (e.g., where RF receiver 86 is not part of the uplink portion 70), RF receiver 86 may be one of the electronic devices coupled to or part of the receiver 82. Further, in some instances, the RF receiver 86 may be coupled to the ECU 100 and operably controller thereby. Other embodiments also exist wherein the ECU 100 is absent—e.g., the RF receiver 86 (in the downlink portion 74) is coupled to other devices, the bus 88, or both.

According to at least one implementation, the transmitter and receiver 80, 82 of the data transfer system 76 are a serializer and deserializer, respectively; thus, the transmitters 80, 82 may be paired as a serializer/deserializer or SerDes pair. As will be appreciated by skilled artisans, a serializer may have multiple, parallel input ports 110 and two output ports 112 for differential communication over link 72. Similarly, the deserializer may have two input ports 114 for differential communication and multiple, parallel output ports 116. According to one embodiment, the serializer may be configured to receive parallel input data via ports 110, configure the parallel data to a serialized format, and then transmit the parallel data (now in the serialized format) to the deserializer via ports 112—while continuously receiving new parallel input data via input ports 110. This serializer may accomplish this by means of a sample and hold functionality, which will be explained in greater detail below. Moreover, in some embodiments, the serialization (i.e., at the serializer) may be performed without the use of processing units 88, 94. And in one embodiment, the serializer utilizes a clock 120 to facilitate the communication. The clock 120 may be coupled to or may be a part of (e.g., embedded within) the serializer. The deserializer may be configured to receive this parallel data via the link 72 and its differential input ports 114, configure the parallel data to a parallel format again using data from clock 120, and then provide the parallel data via its parallel output ports 116. In FIG. 4A, this data is provided to the ECU 100—e.g., to the processing unit 102. The serialization of parallel data and deserialization of the data to a parallel format is known. It should be appreciated that the while all of the digitized wireless signal data is shown received by ECU 100 by couplings 90", it may be received collectively and severally by other devices including multiple ECUs (similar to ECU 100).

The serial link 72 may receive and carry the parallel data (now serialized) as an electrical signal between the output ports 112 of the serializer and the input ports 114 of the deserializer. According to at least one implementation, this electrical signal may conform to low voltage differential signaling (LVDS). Thus, the electrical signal may be defined by one or more differential electrical parameters readable by the deserializer. Differential electrical parameters include voltage and current. LVDS is known, and neither the magnitudes of the parameters (voltage and/or current) nor other aspects of LVDS will be explained in detail herein. In addition, the differential serial link (i.e., a differential pair such as a twisted wire pair) is known as well.

Both the serializer and deserializer may be considered high-speed or as having high through-put, as those terms are understood in the art. For example, the SerDes pair may be configured to transmit/receive at Gigabit, multi-Gigabit, or faster speeds. In addition, the SerDes pair may have corresponding input and output ports. For example, the index positions and quantity of input ports 110 on the serializer may correspond to the index positions and quantity of output ports 116 on the deserializer.

One commercially available implementation of the serializer is the DS90UR905Q and one commercially available implementation of the deserializer is the DS90UR906Q, both manufactured by Texas Instruments. This SerDes pair is configured to translate a parallel red-green-blue (RGB) video interface into a high-speed serialized interface over a single differential link (i.e., a two wire pair) to ten or more meters in length. The speed of video data transmission is configurable between 140 Megabits per second (Mbps) and 1.82 Gigabits per second (Gbps). The parallel interfaces of the serializer and the deserializer each dedicate twenty-four ports for video (8 red inputs or outputs, 8 green inputs or outputs, and 8 blue inputs or outputs) and six additional dedicated ports for video control (Serializer: horizontal sync (HS) input, vertical sync (VS) input, data enable (DE) input, pixel clock input (PCLK) input; and Deserializer: horizontal sync (HS) output, vertical sync (VS) output, data enable (DE) output, pixel clock output (PCLK) input, lock (LOCK) output, and pass (PASS) output). The serializer is configured to embed the clock, balance the RGB payload, and level shift the electrical signals associated with the RGB payload to high-speed LVDS. And the deserializer is configured to recover the RGB payload, recover the video controls signals, and extract the clock from the differential serial link. The serializer utilizes an input latch, phase lock loop (PLL), a timing/control module, and a pattern generator while the deserializer utilizes an output latch, an error-detection module, a clock and video data recovery module, and a timing/control module. The deserializer is capable of locking the incoming video data without the use of a training sequence, special sync patterns, or a reference clock. Other commercially available implementations exist within the video data SerDes family (by Texas Instruments), including a 48-pin Very Very Thin Quad Flat No-leads package (WQFN) serializer and a 60-pin WQFN deserializer. Skilled artisans will recognize that the DS90UR905Q/906Q pair is designed and configured for the serialization of 18-bit (high color) or 24-bit (true color) video data (and the 48-pin, 60-pin packages enabling 30-bit or 36-bit deep color).

The present disclosure may utilize a SerDes pair such as the described commercially available implementation to transmit non-video data in the vehicle. The RGB video ports may be utilized for sensor data inputs, antenna data inputs, etc. (as will be explained more below). Moreover, the length of the differential serial link is suitable for many vehicle applications as the length may vary up to approximately ten meters or more.

In general, the operation of the system 20 may proceed according to the following illustrative example. One or more EM waves (e.g., of similar or different lengths) may be received at the antenna array 30. Each of these waves may be amplified by the LNA(s) 84, processed by their respective receiver(s) 86 and provided as data pairs (e.g., pairs of original data and redundant data) to the master processing unit 88. The unit 88 may configure the signals and provide them in parallel to the first transmitter 80 via couplings 90' which may serialize them for transmission over the differential link 72. Other signals, as will be appreciated by skilled artisans, also may be sent over the link 72—e.g., control signals/data, such as clock data from clock 120. The second receiver 82 may receive the signals (wireless signal data, control data, etc.), process the signals converting the serialized data to a parallel format. This parallelized data may be provided to the ECU 100 and used elsewhere in the vehicle.

The transmitter 80 may operate without the processing unit 88 in some embodiments. Also, in some implementations, the LNAs are directly coupled to the processing unit 88 or the transmitter 80—e.g., and the RF receiver(s) 86 are located in the downlink portion 74 (as optionally shown in FIG. 4A).

The transmitter 80 may control the wireless signal data being sent to the second receiver 82 (controlling, for example, any enabling, inhibiting, delaying or lagging, etc.). A sample and hold functionality (which may or may not be part of the transmitter 80) may be used to continuously receive parallel, wireless signal data from the antenna array 30 while the serialization process occurs so that no wireless signal data is lost due to delays or lags. Of course, this may occur via other means as well; e.g., the processing unit 88 may control the first receiver 82—e.g., by regulating the receipt of the parallel data from the sources 20, the serialization thereof, the transmission thereof, and/or the sampling and holding functionality thereof.

While FIG. 4A illustrates only nine antennas (e.g., each receiver 86 providing a pair of data via 90a, 90b), it should be appreciated that different quantities of antennas 40, different quantities of input ports 110 (first transmitter 80), and different quantities of output ports 116 (second receiver 82) are possible. These quantities are merely examples; the quantities may vary—some implementations having more or less than those shown.

Lastly, it should be appreciated that the vehicle 10 of FIG. 1 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 10 may have multiple communication systems 20 therein; e.g., in one or more of the mirror assemblies 12, the headliner 14, the instrument panel 16, the shelf 18, the door panel 17, the interior trim 19, or in any other suitable location.

Method—

Now turning to a method 500 of implementing the communication system 20 as shown in FIG. 5, the method begins with step 510 wherein one or more radio frequency (RF) signals are received at the antenna array 30. In one implementation, nine different RF signals are being received simultaneously (or at least somewhat overlapping in time). The nine RF signals may each be defined by a different frequency and their respective signal strengths may vary. The method then proceeds to step 520.

At step 520, the RF signals may be amplified by the LNAs 84 and provided to the receivers 86. The receivers may process their respective RF signal—e.g., as will be appreciated by skilled artisans, this may include demodulation and other signal processing techniques. The receivers 86 may provide a single data output or dual data outputs. In this example, the receivers have dual outputs coupled to the data connections 90a, 90b. Hereafter, the method may proceed to step 530.

In step 530, nine data pairs may be received by the high-speed transmitter 80 (e.g., the serializer), each pair including original and redundant data or data streams O, R (if desired). The nine data pairs may be provided directly from the RF receivers 86, or as illustrated in FIG. 4A, the master processing unit 88 may configure and/or process the data pairs first and then provide them to the serializer. In instances where the unit 88 processes the data pairs, the unit 88 may participate in the sampling and/or holding of the data prior to its receipt by the transmitter 80.

In any instance, steps 510, 520, 530 may occur continuously. Thus, the antenna array 30 may receive RF signals continuously and ultimately the serializer may continuously receive data corresponding to one or more of the nine antennas 40. Then, the method 500 proceeds to step 540.

In step 540, the serializer may or may not sample the pairs of data. For example, sampling may have occurred at the processing unit 88 or not. The serializer samples a data set (i.e., all available data pairs)—i.e., the serializer samples (and/or serializes) the data pairs received at or near the same instant in time. Where necessary, the serializer may latch and/or hold each sampled data set or even data pairs within the set (e.g., symbolized or depicted in FIG. 5 as buffers). FIG. 5 illustrates four buffers or translators 130a, 130b, 130c, 130d; however, this is merely an example. The serializer may have more or fewer buffers for temporarily holding the data sets. In step 540, the most recent or 'current' data set passes through the respective buffer to be serialized in step 550.

In step 550, the serializer 'serializes' the current data set by converting a portion of the wireless signal data into a serialized format and by adding any suitable serialized control data (e.g., including a timestamp obtained via the embedded clock 120). For example, where nine receivers 86 are coupled to the serializer, each having original and redundant data connections 90a, 90b, each data set will include data from eighteen parallel connections to sample and hold (as necessary). Skilled artisans are familiar with serialization techniques, including serialization rates, clocking, timestamps, etc. After step 550, the method proceeds to step 560.

In step 560, the serializer transmits the current data set over the differential serial link 72. In one embodiment, the transmission uses low voltage differential signaling (LVDS) and any suitable protocol may be used with the serializer and deserializer (e.g., 8B/10B, NRZ, NRZ-I, just to name a few examples).

In step 570, the current data set and any control data is received by the receiver 82 (e.g., the deserializer). The electrical parameters of the transmission (e.g., changes in voltage and/or current) are interpreted to extract the wireless signal data and control data (e.g., the timestamp) during deserialization. Deserialization includes converting the now serialized data again into a parallel format (i.e., parallel data again). Further, deserialization may include latching the parallel, wireless data (e.g., using a sample and hold function). This deserialized data is made available at the output ports 116 of the deserializer. The wireless signal data provided at the output ports 116 may correspond with the wireless signal data provided to the input ports 110 of the serializer (e.g., index positions and quantity). As shown, not all of the input and output ports 110, 116 may be utilized in every application.

In step 580, the deserialized data set may be error-checked or validated. To validate, the pairs of data within the set may be identified and compared to one another. If for example, the redundant data R is expected to be identical (or nearly so) to the original data O of the pair, the method may determine whether the pair of data (e.g., from the associated antenna 40) is acceptable or not. Similarly, for example, if the redundant data R is expected to be an inversion of the original data O of the pair (or nearly so), the method may determine whether the pair of data (e.g., from the associated antenna 40) is acceptable or not. It should be appreciated that the error-checking step may indicate a lack of integrity at various failure points in the communication system 20; e.g., a lack of integrity at the respective antenna 40, LNA 84, RF receiver 86, at one or more of the processing units 88, 102 (when implemented), at the serializer 80, during transmission over the serial link 72, or at the deserializer 82, just to name a few examples. It should also be appreciated that embodiments exist where no redundant data R is transmitted; therefore, validation may not occur or may occur via other known means.

The validation of step 580 may utilize the deserializer or another device (e.g., such as the processing unit 102). In at least one embodiment, step 580 occurs within the deserializer and prior to providing the wireless signal data at the output ports 116 (in step 570). In other embodiments, another device performs step 580 after the wireless signal data is provided at the output ports 116.

If the wireless signal data is not validated, the deserializer 82, the ECU 100, the processing unit 102, or another suitable device may provide an alert indicating that an error has occurred.

Alternative embodiments also exist. For example, in one implementation, each pair of data carried by 90a, 90b may be used to reconstruct the original data O instead of validate the original data O. Similarly, instead of single redundant data R, there may more (e.g., instead of having one or two data connections 90, 90b, there may be three or four or more connections each carrying redundant data). The locations/positions of the antennas 40 on the vehicle 10 may result in some antennas (e.g., of the same type and configured to receive the same band or wavelengths) receiving the wireless RF signal at different signal strengths. Thus, it may be desirable to have one or more redundant connections to better reconstruct the original (now digitized) wireless signal (e.g., at the deserializer).

In one embodiment, there is provided an array of antennas includes antennas 40 each covering different RF bands. In another embodiment, at least of the antennas 40 are in the same RF band. Other arrangements also are possible.

Thus, there have been disclosed an embedded antenna array coupled to a data transfer system in a vehicle. The antenna array is carried by a substrate and may include multiple antennas covering different RF bands. Further, the entire substrate may be hidden in the vehicle and positioned in various locations. The substrate further may carry a high-speed transmitter, which is part of the data transfer system. The high-speed transmitter may be paired with a high-speed receiver located elsewhere in the vehicle. The transmitter and receiver collectively may be a SerDes pair. And the data transfer system may minimize the need for discrete wiring in the vehicle, while providing the benefits of discrete signaling—as the communication system may operate at high-speed and with high integrity.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle RF communication system comprising:
an antenna assembly that includes:
  a substrate sized for a radio frequency-friendly (RF-friendly) region in the vehicle; and
  an antenna array carried by the substrate, wherein the antenna array includes two or more antennas configured for communication in different RF bands;
a master controller comprising a processor and memory electrically coupled to each antenna of the antenna array; and
a serializer, comprising:
  a plurality of input parallel ports for receiving streaming antenna data from each of the antennas in the antenna array; and
  an output port coupled to a differential serial link for transmitting antenna data to a deserializer.

2. The system of claim 1, wherein the RF-friendly region is also concealed in the vehicle.

3. The system of claim 1, wherein the RF-friendly region includes at least one of an instrument panel, a headliner, a door panel, an interior trim region, a shelf, or a side mirror assembly.

4. The system of claim 1, wherein the substrate is a dielectric material having one or more conductive properties.

5. The system of claim 4, wherein the dielectric material includes gold, silver, copper, or any other material having similar electro-magnetic (EM) properties of gold, silver, or copper.

6. The system of claim 1, wherein the two or more antennas are configured to receive two or more of the following RF bands: very low frequency (VLF), low frequency (LF), medium frequency (MF), high frequency (HF), very high frequency (VHF), ultra high frequency (UHF), super high frequency (SHF), extremely high frequency (EHF), or tremendously high frequency (THF).

7. The vehicle RF communication system of claim 1, wherein at least two of the parallel ports of the serializer are coupled to a single antenna of the antenna array so that both primary antenna signal data and redundant antenna signal data, both associated with the single antenna, is sent to the deserializer, wherein the redundant antenna signal data is one of a mirrored signal or an inverted signal enabling error-checking after receipt by the deserializer.

8. The vehicle RF communication system of claim 1, wherein the serializer is configured to transmit a first set of streaming antenna data to the deserializer while sampling and holding a second set of streaming antenna data being received from the master controller, wherein the second set of antenna data is newer than the first set of antenna data.

9. A method of receiving wireless communication using the vehicle RF communication system of claim 8, comprising the steps of:
- receiving first antenna data from a first antenna of the antenna array at the serializer, the first antenna data comprising a first RF signal;
- receiving second antenna data from a second, different antenna of the antenna array at the serializer, the second antenna data comprising a second RF signal, wherein the first and second antenna data collectively comprise the first set of antenna data;
- serializing the first set of antenna data for high-speed transmission over the differential serial link; and
- transmitting the first set of antenna data over the differential link while sampling and holding the second set of antenna data that is received during the serialization, transmission, or both the serialization and transmission, wherein the second set comprises newer first antenna data and newer second antenna data.

10. The method of claim 9, wherein the first set of antenna data further comprises a redundant first antenna data and a redundant second antenna data, wherein the first antenna data is received at a first port of the serializer, the redundant first antenna data is received at a second port of the serializer, the second antenna data is received at a third port of the serializer, and the redundant second antenna data is received at a fourth port of the serializer.

11. The method of claim 10, wherein the redundant first antenna data includes data that is a mirror-image of the first antenna data or an inverted-image of the first antenna data, wherein the redundant second antenna data includes data that is a mirror-image of the second antenna data or an inverted-image of the second antenna data.

12. The method of claim 10, further comprising:
- receiving the first set of antenna data at the deserializer;
- deserializing the first set; and
- error-checking the first set of antenna data by comparing the first antenna data to the redundant first antenna data and by comparing the second antenna data to the redundant second antenna data.

13. The method of claim 12, further comprising: when the first or second redundant antenna data does not adequately match the first or second antenna data, respectively, providing an alert indicating an error has occurred.

* * * * *